Figure 1:
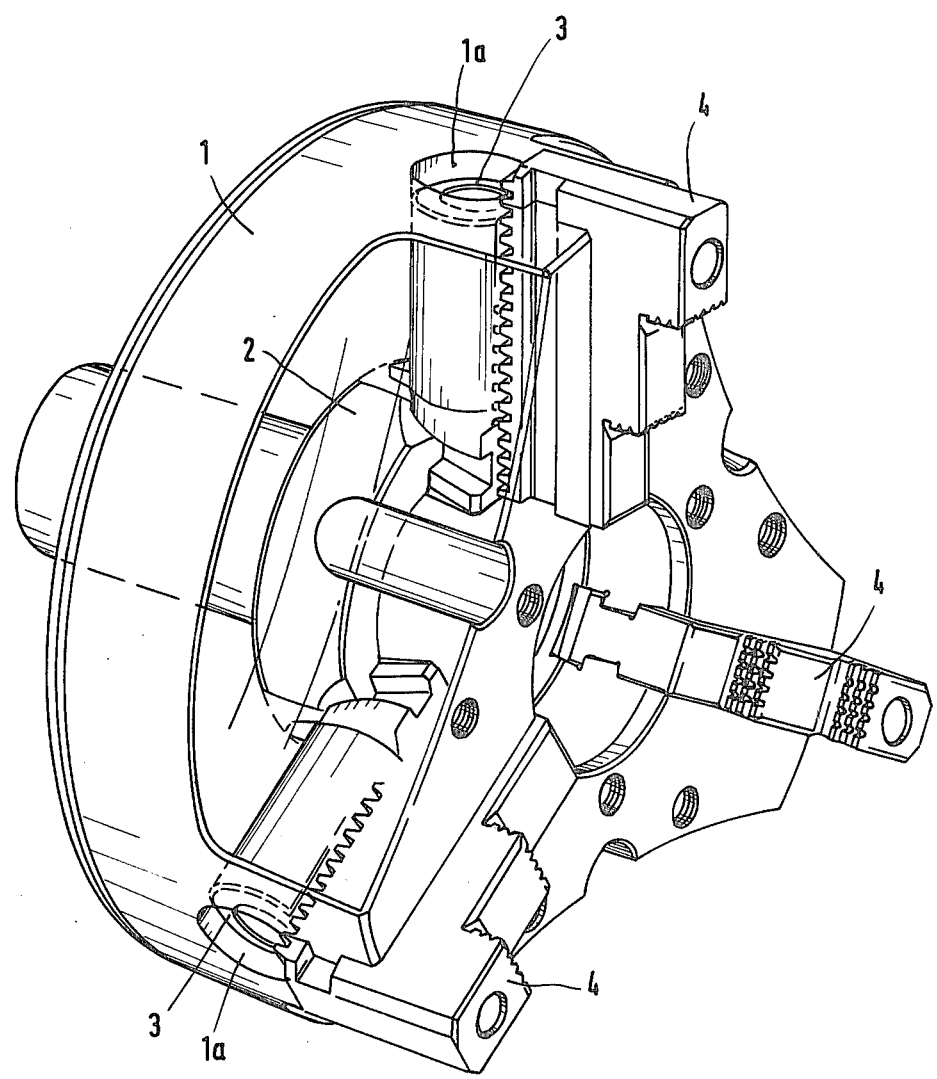

United States Patent [19]

Steinberger

[11] 4,198,067
[45] Apr. 15, 1980

[54] POWER-OPERATED CHUCK

[75] Inventor: Josef Steinberger, Düsseldorf, Fed. Rep. of Germany

[73] Assignee: Paul Forkardt Kommanditgesellschaft, Düsseldorf, Fed. Rep. of Germany

[21] Appl. No.: 920,067

[22] Filed: Jun. 28, 1978

[30] Foreign Application Priority Data

Jul. 2, 1977 [DE] Fed. Rep. of Germany ....... 2729939

[51] Int. Cl.² .............................................. B23B 31/16
[52] U.S. Cl. ..................................... 279/121; 279/123
[58] Field of Search ............... 279/121, 110, 111, 123, 279/1 ME

[56] References Cited

U.S. PATENT DOCUMENTS

| 2,083,414 | 6/1937 | Wettig | 279/1 ME |
| 2,777,704 | 1/1957 | Sloan | 279/123 |
| 3,682,491 | 8/1972 | Sakazaki et al. | 279/121 X |
| 4,007,943 | 2/1977 | Scharfen et al. | 279/121 |

Primary Examiner—Z. R. Bilinsky
Attorney, Agent, or Firm—Martin A. Farber

[57] ABSTRACT

A power-operated chuck with gripping jaws guided radially in a chuck body, each of the jaws being driven by a spur toothing from a drive jaw which is movable radially inside the chuck body. The drive jaws are driven by a chuck piston which is axially movable in the chuck body and operates all the drive jaws in common. Independently of the corresponding gripping jaw, each drive jaw is guided in the radial direction and guided non-displaceably in the tangential direction and fixed in position in the axial direction directly in the chuck body. As a result there occurs an indirect securing of the positive connection between the clamping jaws and driving jaws, which positive connection is directly provided by the spur toothing. The chuck piston which is guided directly in the chuck body can be moved beyond the working stroke into a position in which it is out of engagement with the drive jaws.

6 Claims, 6 Drawing Figures

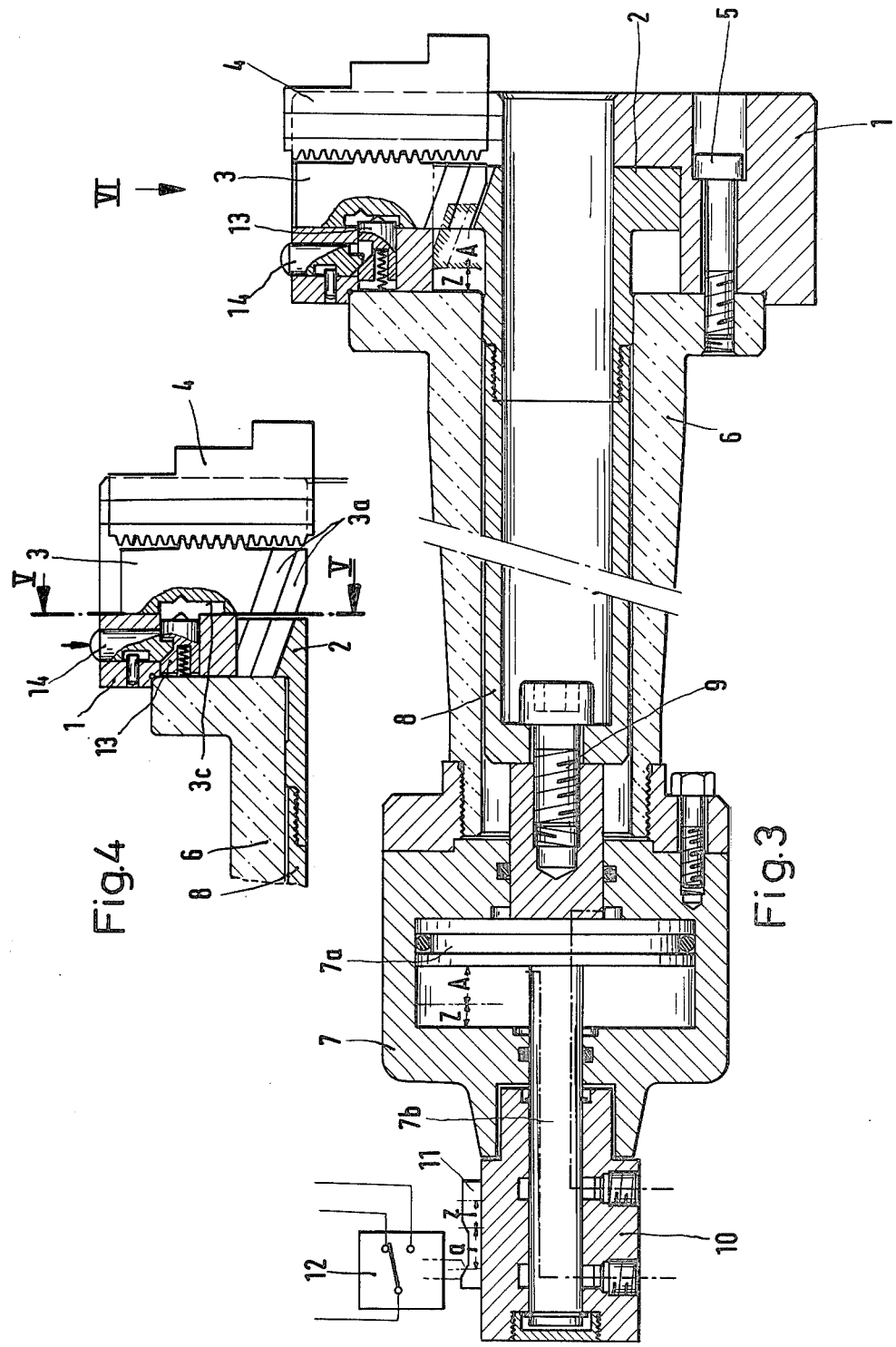

POWER-OPERATED CHUCK

The invention relates to a power-operated chuck with gripping jaws guided radially in a chuck body, which jaws are drivable by means of a spur toothing by a respective drive jaw which is movable radially inside the chuck body, the drive jaws again in turn driven by a chuck piston, the latter being axially movable in the chuck body and jointly operating all the drive jaws.

Power-operated chucks of the type described above are already known. In order to permit a replacement or displacement of the gripping jaws with respect to the drive jaws for adaptation to a different workpiece diameter, the drive jaws and the chuck piston in the known construction are arranged in a displacement cylinder which is displaceable in the axial direction with respect to the chuck body in order to bring the spur toothing between the gripping jaws and the drive jaws out of engagement, so that the gripping jaws which are guided by guide grooves on guide tracks of the chuck body can be either taken completely out of the chuck body or be displaced radially with respect to the drive jaws. This known embodiment of a power-operated chuck with a jaw replacement and displacement device has the disadvantage that the drive of the jaws possesses insufficient rigidity in view of the use of the displacement cylinder which is displaceably mounted in the chuck body, as a result of which there is obtained only insufficient overall precision of the chuck. The chuck known from the patent literature has, for these reasons, not found introduction into practice.

The object of the present invention is to create a power-operated chuck of the type described above, which with the use of the widely used gripping jaws with spur toothing behind the guide permits a rapid replacement and/or displacement of the gripping jaws with great rigidity and high repetition accuracy.

The solution of this problem which is provided by the invention is characterized by the fact that each drive jaw, independently of the corresponding gripping jaw is guided in the radial direction and non-displaceably in the tangential direction and is fixed in position in axial direction, directly within the chuck body, that as a result an indirect guarantee or securing of the positive non-slipping connection between the clamping jaws and driving jaws occurs, the positive connection resulting from the spur toothings, and that the chuck piston, which piston is guided directly in the chuck body, can be moved beyond the working stroke into a position in which it is out of engagement from the drive jaw.

The development of the chuck in accordance with the invention permits rapid removal of the drive and gripping jaws which are connected to each other by the spur teeth as soon as the chuck piston has been brought beyond its working stroke into an end position in which it is out of engagement with the drive jaws. While the spur teeth of the drive and gripping jaws are held in continuous engagement as a result of their being guided and set in position by the chuck body as long as the jaws are contained within the chuck body, the drive and gripping jaws can readily be separated from each other as soon as they have been pulled completely out of the chuck body. Outside the chuck body, a rapid transposition, translation or rotation of the gripping jaws on the drive jaws can then be achieved, as well as replacement of the gripping jaws, which gripping jaws in known manner, can be formed either as a single part or else in multiple parts from base and cap or top jaws.

By the development in accordance with the invention of the power-operated chuck, the result is obtained that the gripping jaws or gripping-jaw sets, respectively, of the popular and economically manufactured collet bar chucks can be used for power-operated rapid-change chucks, as a result of which an economical solution is obtained for the power-operated chuck in accordance with the invention. By the direct guidance both of the gripping jaws and of the drive jaws on the chuck body, the chuck of the invention has a high rigidity. A high repetition accuracy of the chuck of the invention is obtained by the direct position setting or determination of the drive and gripping chucks on the chuck body. Another advantage is that the rapid-change chuck is of simple and strong construction, which permits short structural lengths and makes it possible to employ normal power drives with axial drive, which are low in cost due to their universal applicability and their simple construction. By the proposal in accordance with the invention, there is obtained, as a whole, a high quality, low-cost power-operated chuck with affords the possibility of rapid change and adjustment of the gripping jaws with high, rotary, concentricity or true-running accuracy.

For a preferred embodiment of the invention it is proposed that the spur toothings of drive jaws and gripping jaws each are formed as a trapezoidal toothing lying inclined to the longitudinal axis of the jaws and that each gripping jaw is provided with guide grooves extending in the longitudinal direction thereof and that the chuck body is provided with corresponding guide tracks extending in radial direction. This special formation of the spur teeth between the drive and gripping jaws and of the guidance for the gripping jaws is in itself known and therefore is to be viewed only in combination with the main concept of the invention.

In accordance with another feature of the invention, each drive jaw has a basic cylindrical shape and is guided and simultaneously defined in position in a radial guide bore of the chuck body; and that within the basic cylindrical shape, the drive parts, for example, T-shaped keys, which cooperate with the chuck piston, as well as the spur toothing are formed. This further development in accordance with the invention results in the advantage of simple manufacture of the slide tracks necessary for the guiding and positioning fixing of the drive jaws, since the cylindrical guide bore in the chuck body assumes all of these tasks while being capable of simple and at the same time accurate manufacture.

In the event of a break of a drive member, for instance a wedge key catch, the related drive jaw from being thrown out of the chuck body together with the gripping jaw, in accordance with another feature of the invention, each drive jaw is provided with a recess into which there engages a spring-biased bolt or pin, which bolt can be pulled back out of the recess by means of an actuating member, in order to remove the drive jaw from the chuck body. This actuating member may be actuated either manually or automatically, for instance by the chuck piston; in the latter case it is necessary, in order to obtain the required reliability of operation, to provide an electric interlock of the spindle drive so that the placing in operation of the spindle rotary drive is impossible in the retracted position of the chuck piston, in which position the piston is out of engagement with the drive jaws and at the same time the pins respectively engaged in a recess of the drive jaws are retracted by the chuck piston.

Figure 2:
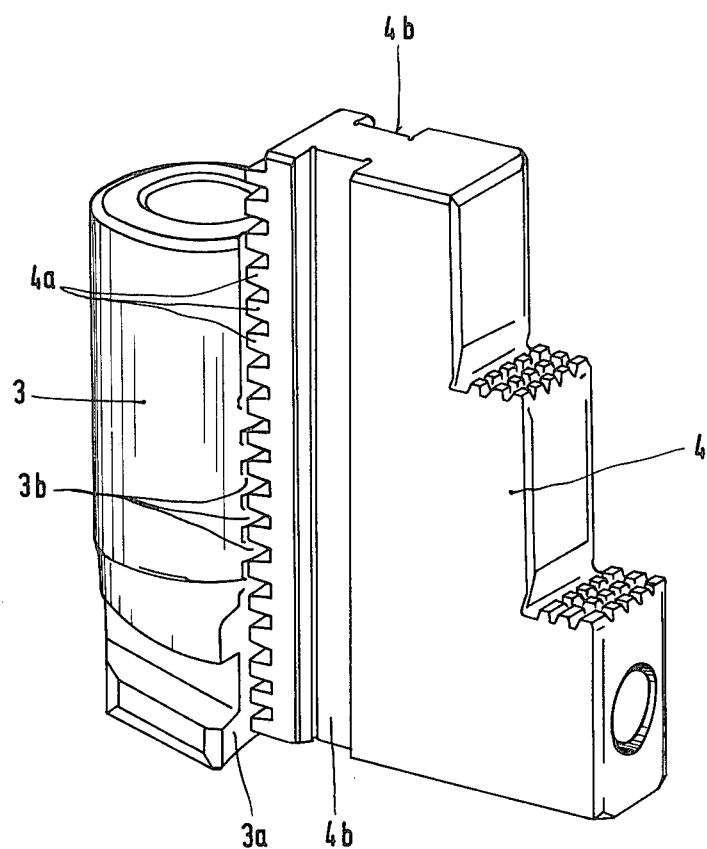
Figure 5:
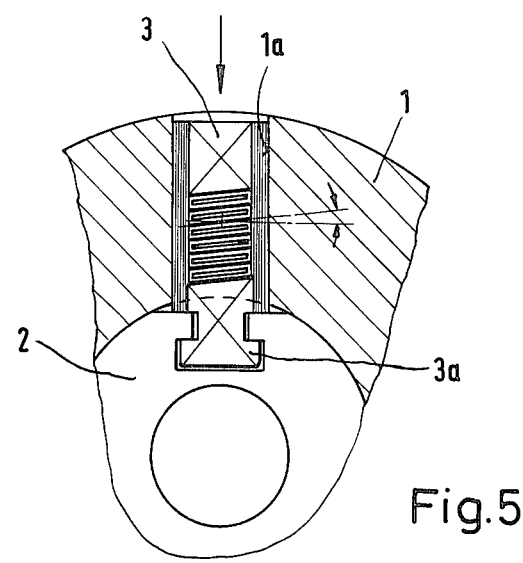
Figure 6:
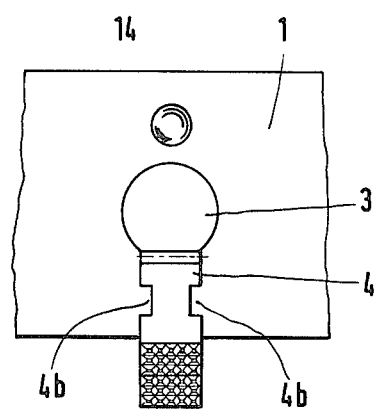

One embodiment of the chuck in accordance with the invention is shown, by way of example, in the drawing, in which:

FIG. 1 is a perspective view of the chuck,

FIG. 2 is a perspective illustration of a drive jaw and a gripping jaw removed from the chuck body, FIG. 3 is a longitudinal section through the chuck, fastened to a spindle, together with a corresponding pressure-fluid cylinder, FIG. 4 is a partial section which shows the disengaged position of chuck piston, FIG. 5 is a partial section along the section line V—V of FIG. 4, and FIG. 6 is a top plan view of a part of the chuck body according to the arrow VI in FIG. 3.

The chuck, which in the embodiment shown by way of example comprises a three-jaw chuck, has a chuck body 1 in which a chuck piston 2 is displaceably guided in axial direction. This chuck piston 2 has T-shaped cutouts (see FIG. 5) with wedge key-shaped guide surfaces which cooperate with correspondingly formed wedge key catches of a drive jaw 3. This drive jaw 3 has a basic cylindrical shape within which the wedge key catches 3a, which cooperate with the chuck piston 2, and a spur toothing 3b are formed. By means of this spur toothing 3b, each drive jaw 3 engages with a spur toothing 4a of the gripping jaw 4 which may be formed as a single piece or of several pieces. Regardless of this embodiment, the gripping jaw 4 is constructed with opposite guide grooves 4b which cooperate with corresponding guide tracks of the chuck body 1, as can best be noted from FIG. 1.

From the perspective views of FIGS. 1 and 2 it may be recognized that an axial movement of the chuck piston 2, which is guided directly in the chuck body 1, produces a radial movement of the three drive jaws 3, which jaws with their cylindrical surface are arranged in a radial guide bore 1a in the chuck body 1 such that each drive jaw 3, independently of the corresponding gripping jaw 4, is guided both in the radial direction and non-shiftably in the tangential direction as well as fixed in position in the axial direction of the chuck, directly in the chuck body 1. By means of the spur toothing 3b which is formed on the front side of the drive jaw 3 and the spur toothing 4a which is formed on the rear side of each gripping jaw 4, the corresponding gripping jaw 4 is carried along during each radial movement of the drive jaw 3. This drive is effected by the positive form fitting which is present in the radial direction between the spur teeth 3b and 4a, which teeth in the illustrated embodiment are formed as trapezoidal teeth lying inclined relative to the longitudinal axis of the jaws. The angle of these trapezoidal teeth with respect to the longitudinal axis of the drive jaw 3 is shown in FIG. 5. The independent guidings of drive jaw 3 and gripping jaw 4 in the chuck body 1 results in an indirect guarantee or securing of the positive form-fitting contact connection (without friction or slipping) between the gripping jaw 4 and the drive jaw 3 as long as they are located within the chuck body 1. As soon as the set of jaws comprising the drive jaw 3 and the gripping jaw 4 has been removed from the chuck body 1 according to FIG. 2, they can be readily separated from each other without anything more. As a result both a shifting or rotation of the gripping jaws 4 with respect to the drive jaws 3 is possible as well as a complete replacement of one gripping jaw 4 by another one.

In addition to the overall view of FIGS. 1 and 2, FIGS. 3 to 6 show further details of the chuck described above. From FIG. 3 it can be noted that the chuck, shown in perspective in FIG. 1, is fastened by means of chuck fastening screws 5 to the flange of the spindle 6 of a machine tool, the rest of which is not shown. This spindle 6 furthermore carries a pressure-fluid cylinder 7 which rotates with the spindle 6. The piston 7a of this pressure-fluid cylinder is connected via a connecting rod 8 with the chuck piston 2. In the embodiment shown by way of example in FIG. 3, this connecting rod 8 is screwed at its front end with the chuck piston 2 and connected at its rear end by a tension bolt or screw 9 with the piston 7a of the pressure-fluid cylinder 7.

The piston 7a of the pressure-means cylinder 7 by means of a pin 7b carries a so-called pressure-fluid transfer housing 10 which is mounted rotatably on the pin 7b and is stationary in contradistinction to the pressure-fluid cylinder 7. The pressure-fluid transfer housing 10 has two connections for pressure-fluid conduits. The pressure fluid which is introduced into the pressure-fluid transfer housing 10 from the pressure-fluid conduits passes, even with a rotating spindle 6, into the pin 7b and from there, via the conduits shown in dot-dashed line in FIG. 3, either to the front side or to the rear side of the piston 7a, so that the actuation of the latter, and thus an actuation of the chuck is possible even when the spindle 6 is rotating.

A cam 11 for the sensing pin of switch 12 is fastened on the pressure-fluid transfer housing 10, which by means of its rotatable mounting on the pin 7b, the mounting being however non-displaceable in the axial direction, participates in each axial movement of the piston 7a. This switch 12 insures that the rotary drive of the spindle 6 cannot be switched-on when the chuck piston 2 is disengaged from the drive jaws 3.

In FIG. 3 the front limit position of the chuck piston 2 within the chuck is shown in solid lines. A position of the chuck piston 2 which limits the rearward movement of the working stroke is indicated in dot-dash lines. The working stroke is designated by the letter A in FIG. 3. This working stroke A of the chuck piston 2 corresponds to the working range a and the cam 11.

By travel over an additional stroke Z the chuck piston 2 can be brought into a position out of engagement from the drive jaws 3. This disengaged position is shown in FIG. 4. The corresponding additional range z is also indicated on the cam 11. This additional range Z makes it evident that in this region the switch 12 is closed and thus the rotary drive for the spindle 6 cannot be turned on.

In order to prevent the flying off of the corresponding drive jaw 3 and of the corresponding gripping jaw 4 in case of the breaking of a wedge key catch 3a, each drive jaw 3 is provided with a cutout 3c into which there engages a spring-loaded bolt or pin 13. This bolt permits a movement of the drive jaw 3 both within the range of the working stroke A and within the range of the additional stroke Z but comes against the drive jaw 3 if, upon the breaking of the wedge key catch 3a, the drive jaw 3 should be thrown by centrifugal force out of the chuck body 1. The bolt 13 thus constitutes a reliable safety device for the chuck, in case of defects in the drive.

At the same time, the spring-loaded bolt 13 in the embodiment shown prevents the accidental falling of the drive jaws 3 out of the chuck body 1 when the chuck piston 2 is out of engagement with the wedge key catch 3a. A removal of the drive jaws 3 and thus of the gripping jaws 4 is only possible, with the embodiment shown in FIGS. 3 to 6, if the bolt 13 has been pulled back by an actuating member 14 against the force of its spring. In the embodiment example, this actuating member 14 must be pressed manually into the chuck body 1. It thereby pushes the bolt 13 back via an oblique surface so that the bolt disappears within the chuck body 1, as shown in FIG. 4. In this position, the drive jaw 3 and, with it, the gripping jaw 4 can be pulled in radial direction out of the chuck body 1. The bolt 13 thus in addition to its safety function sees to it that the drive jaws 3 with the gripping jaws 4 can only be removed intentionally from the chuck body 1.

I claim:

1. A power-operated chuck comprising, a chuck body formed with radial oriented guide bores and independently therefrom radial oriented guide means both extending continuously therethrough to the outer surface of the chuck body, drive jaws mounted radially movable in said chuck body complementarily in said guide bores and removeable therefrom, gripping jaws at least partially complementarily mounted in said guide means in said chuck body and removeable therefrom, said guide means for radially guiding said gripping jaws therein, spur teeth means for effecting a positive non-releaseable connection between said gripping jaws and said drive jaws, respectively, maintained exclusively by said guide bores and guide means and the complementary mounting of said drive jaws and gripping jaws, respectively, therein, and said spur teeth means for driving each of said gripping jaws by one of said drive jaws, respectively, and for effecting a releaseable connection without tools between said gripping jaws and said drive jaws, respectively, when said jaws are removed from said guide bores and guide means, a chuck piston means, mounted directly guideable in said chuck body and axially movable in said chuck body, for jointly driving all said drive jaws in an engaged position therewith, each of said drive jaws, independently of a corresponding gripping jaw being mounted directly within said chuck body in one of said guide bores, being guided therein in a radial direction and non-displaceably in a tangential direction and being fixed therein in position in an axial direction, whereby an indirect securing of the positive non-slipping connection between said gripping jaws and said driving jaws, respectively, occurs, means for moving said chuck piston means beyond a working stroke into a disengaged position from said drive jaws, whereby said drive jaws can be radially removed through said guide bores from said chuck body together with said corresponding gripping jaws from said guide means for relative readjustment outside said chuck body.

2. The chuck according to claim 1, wherein said spur teeth means constitute teeth of said drive jaws and said gripping jaws and each are formed as trapezoidal teeth oriented inclined to the longitudinal axis of said jaws.

3. The chuck according to claim 1, wherein each of said gripping jaws is formed with guide grooves constituting said guide means extending in the longitudinal direction of said gripping jaws, said chuck body is formed with corresponding guide tracks extending in the radial direction thereof, said guide tracks cooperatively engage in said guide grooves.

4. The chuck according to claim 1, wherein each of said drive jaws has a basic cylindrical shape, said chuck body forms a plurality of said radial oriented guide bores and each of said drive jaws is guided and simultaneously set in position in one of said guide bores, respectively, of said chuck body, each of said drive jaws within the basic cylindrical shape are formed with drive part means for driving cooperation with said chuck piston means and said spur teeth means.

5. The chuck according to claim 4, wherein said drive part means constitute wedge key catches for driving engagement of said drive jaws, respectively, by said chuck piston means.

6. The chuck according to claim 1, wherein each of said drive jaws is formed with a recess, a spring-biased bolt engages into said recess, actuating means for pulling said bolt out of said recess for removing said drive jaws, respectively, from said chuck body.

* * * * *